United States Patent
Nara et al.

(10) Patent No.: US 8,818,248 B2
(45) Date of Patent: Aug. 26, 2014

(54) IMAGE FORMING APPARATUS

(75) Inventors: Takashi Nara, Kawagoe (JP); Fuminori Moro, Hachioji (JP); Tadashi Matsudaira, Hachioji (JP); Youbao Peng, Hino (JP); Satoshi Ogata, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 340 days.

(21) Appl. No.: 13/424,991

(22) Filed: Mar. 20, 2012

(65) Prior Publication Data

US 2012/0251150 A1    Oct. 4, 2012

(30) Foreign Application Priority Data

Mar. 29, 2011 (JP) ................. 2011-071524

(51) Int. Cl.
*G03G 15/01* (2006.01)
(52) U.S. Cl.
USPC .......................... 399/301; 399/302
(58) Field of Classification Search
USPC .................. 399/301, 302
See application file for complete search history.

(56) References Cited

U.S. PATENT DOCUMENTS

| | | | |
|---|---|---|---|
| 5,452,073 A | 9/1995 | Kataoka | |
| 5,715,498 A | 2/1998 | Takeuchi et al. | |
| 2001/0005266 A1 | 6/2001 | Kataoka et al. | |
| 2007/0242965 A1* | 10/2007 | Akamatsu | 399/49 |
| 2008/0213009 A1* | 9/2008 | Kamoshita et al. | 399/313 |
| 2008/0226361 A1* | 9/2008 | Tomita et al. | 399/301 |
| 2008/0310873 A1 | 12/2008 | Ono | |
| 2009/0231606 A1 | 9/2009 | Kawai et al. | |
| 2010/0231940 A1 | 9/2010 | Kaima | |

FOREIGN PATENT DOCUMENTS

JP    2005-292760 A    10/2005

OTHER PUBLICATIONS

Extended European Search Report for Application No. 12160799.8-1903/2506557; Date of Mailing: Jul. 9, 2013; 7 pgs.

* cited by examiner

*Primary Examiner* — David Gray
*Assistant Examiner* — Tyler Hardman
(74) *Attorney, Agent, or Firm* — Cantor Colburn LLP

(57) ABSTRACT

An image formation control section sets a secondary transfer section in the pressed state in the case of execution of a main scanning correction processing as color registration correction, and sets the secondary transfer section in the separated state in the case of execution of a sub-scanning correction processing, an entire lateral magnification correction processing, a partial lateral magnification correction processing, or a skew correction processing, which is the correction of the image position for components other than the main scanning direction as color registration correction so as to prevent the situation where the correction accuracy of the image position with respect to the main scanning direction decreases and to prevent a decrease in print quality due to a residual image of a registration correction processing.

7 Claims, 4 Drawing Sheets

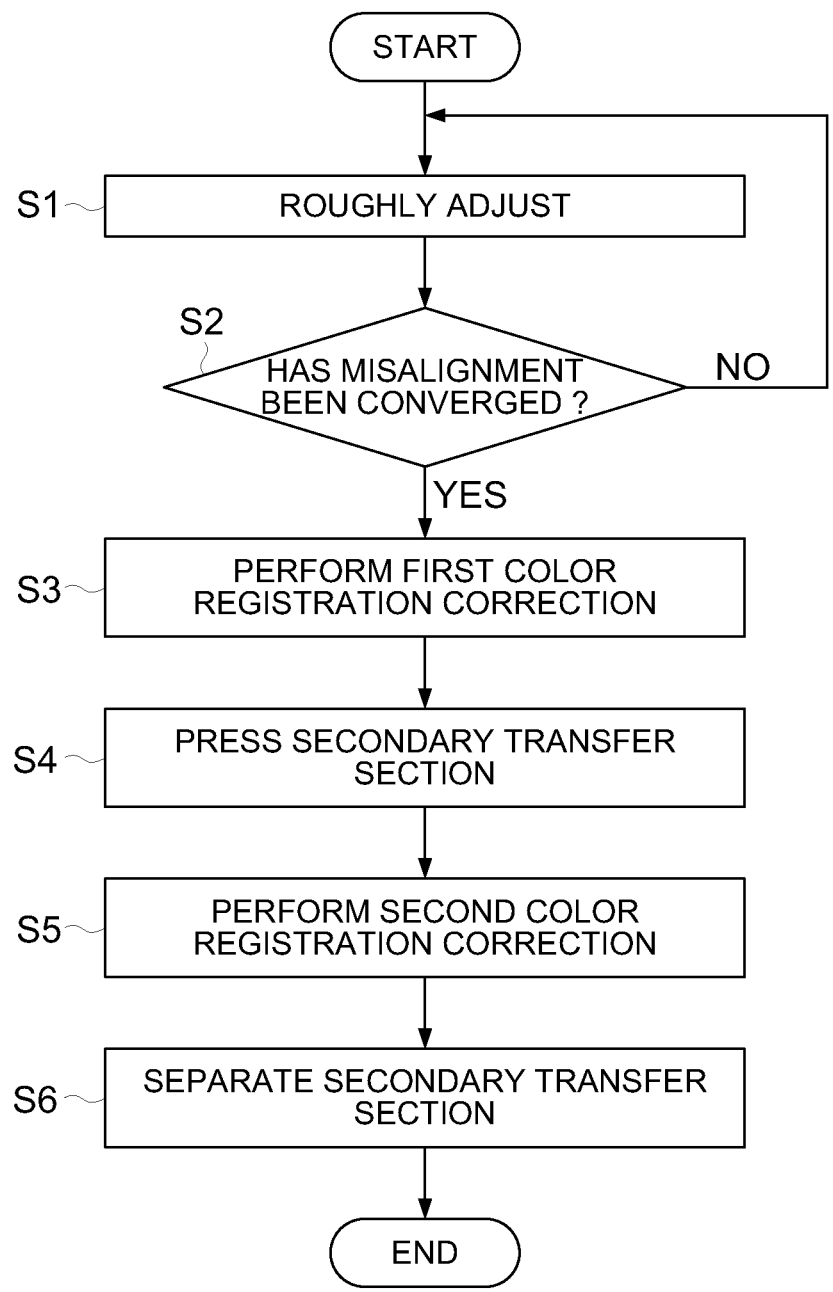

IMAGE FORMING APPARATUS

This application is based on Japanese Patent Application No. 2011-071524 filed on Mar. 29, 2011 with Japanese Patent Office, the entire content of which is hereby incorporated by reference.

BACKGROUND OF THE INVENTION

The present invention relates to an image forming apparatus.

Conventionally, image forming apparatuses have been known as printers and copiers. Especially, attention has been paid to color image forming apparatuses to form full-color images. For example, in a color image forming apparatus, a plurality of image forming sections each corresponding to a different color are arranged in tandem and units thereof are configured opposed to an intermediate transfer section such as an intermediate transfer belt. In such a color image forming apparatus, due to changes in the operation ambience including temperature and humidity and degradation with age of members, the positions of images formed by individual image forming sections are misaligned in some cases. Therefore, a method to correct the image position of each color, which is so-called registration correction processing, is known. For example, Unexamined Japanese Patent Application Publication No. 2005-292760 discloses a method in which the conveyance interval between sheets is increased compared with a predetermined interval, a plurality of correction pattern images are formed in the enlarged region on a conveyance device or an intermediate transfer section, and then the pattern images having been formed in the region between sheets are detected to correct the misalignment of each image position.

Further, with regard to such a type of image forming apparatus, there is known an apparatus provided with a configuration in which a secondary transfer section to transfer an image having been transferred to an intermediate transfer section onto a sheet can be pressed against the intermediate transfer section and separated therefrom.

Incidentally, in the case where the secondary transfer section has been separated from the intermediate transfer section, the intermediate transfer belt is considered to cause deflection. When with this situation, registration correction processing is carried out and then the intermediate transfer belt is rotated, the intermediate transfer belt meanders from side to side (in the main scanning direction), and thereby it becomes possible that the misalignment of the image position with respect to the main scanning direction contains unnecessary fluctuation components. Thereby, it is conceivable that the correction accuracy of the image position with respect to the main scanning direction deceases.

In contrast, in the case where registration correction processing is carried out in the state where the secondary transfer section has been pressed, the problem as described above is inhibited, but it is possible that through the pressure portion between the intermediate transfer section and the secondary transfer section, a pattern image for correction is transferred onto the secondary transfer section. In this case, when a usual print job is executed, an image having been transferred to the secondary transfer section is transferred onto a sheet, resulting in the possibility of print quality degradation. Incidentally, some secondary transfer sections have a cleaning member such as a blade. However, to expect elimination performance to the extent that the above problem is solved from the member, the cost is increased and the mechanism is complicated, which is hardly a response with a good balance.

SUMMARY

In view of these circumstances, the present invention was completed, and an object thereof is to prevent the situation where the correction accuracy of the image position in the main scanning direction is decreased, and also to inhibit print quality degradation due to a residual image associated with registration correction processing.

To realize at least one of the above objects, in a first embodiment of the invention reflecting one aspect of the present invention, there is provided an image forming apparatus having an image forming section for forming an image to be transferred, an intermediate transfer section to which the image having been formed by the image forming section is transferred, a secondary transfer section for transferring to a sheet, the image having been transferred to the intermediate transfer section, a detection section for detecting the image having been transferred to the intermediate transfer section, a correction section for performing correction processing of a position of the image formed by the image forming section based on a detection result of the detection section, and a transfer control section for performing switching control between a pressed state where the secondary transfer section is pressed against the intermediate transfer section and a separated state where the secondary transfer section is separated from the intermediate transfer section. In this case, when the correction section carries out, as the correction processing, a first correction processing which is a correction processing of the image position with respect to a main scanning direction, the transfer control section sets the secondary transfer section in the pressed state, and when the correction section carries out, as the correction processing, a second correction processing which is a correction processing of the image position with respect to a component other than the main scanning direction, the transfer control section sets the secondary transfer section in the separated state.

In the first embodiment of the invention, it is preferable that when performing the correction processing, the correction section carries out the second correction processing first and then carries out the first correction processing, and the transfer control section switches the secondary transfer section being in the separated state into the pressed state after the performance of the second correction processing.

In the first embodiment of the invention, it is preferable that the transfer control section sets the secondary transfer section in the separated state as an initial state and then switches the secondary transfer section to the pressed state in response to execution of a print job, and the correction section carries out the first correction processing and the second correction processing outside time of the execution of the print job.

In the first embodiment of the invention, it is preferable that the correction section allows the image forming section to form a pattern image for correction and also corrects the position of the image based on the detection result of the detection section with respect to the pattern image for correction every time the first correction processing and the second correction processing are carried out.

In the first embodiment of the invention, it is preferable that the transfer control section switches the secondary transfer section to the pressed state after the pattern image for correction for the second correction processing has passed through the detection section.

In the first embodiment of the invention, it is preferable that the image forming section is composed of a plurality of image forming sections corresponding to colors which serve as elements of a color image, and the transfer control section switches the secondary transfer section to the pressed state after the pattern image for correction, which has been formed by the image forming section located most upstream in a rotational direction of the intermediate transfer section has passed through the detection section.

In a second embodiment of the invention, there is provided an image forming apparatus having an image forming section for forming an image to be transferred, an intermediate transfer section to which the image having been formed by the image forming section is transferred, a secondary transfer section for transferring to a sheet, the image having been transferred to the intermediate transfer section, a detection section for detecting the image having been transferred to the intermediate transfer section, a correction section for performing correction processing of a position of the image formed by the image forming section based on a detection result of the detection section, and a transfer control section for performing switching control between a pressed state where the secondary transfer section is pressed against the intermediate transfer section and a separated state where the secondary transfer section is separated from the intermediate transfer section. In this case, the transfer control section sets the secondary transfer section in the separated state as an initial state, and when the correction section corrects the image position with respect to a main scanning direction as the correction processing, the transfer control section sets the secondary transfer section in the pressed state.

BRIEF DESCRIPTION OF THE DRAWINGS

FIG. 5 is a flowchart showing operation steps of color registration correction processing.

DETAILED DESCRIPTION OF THE PREFERRED EMBODIMENT

Figure 1:
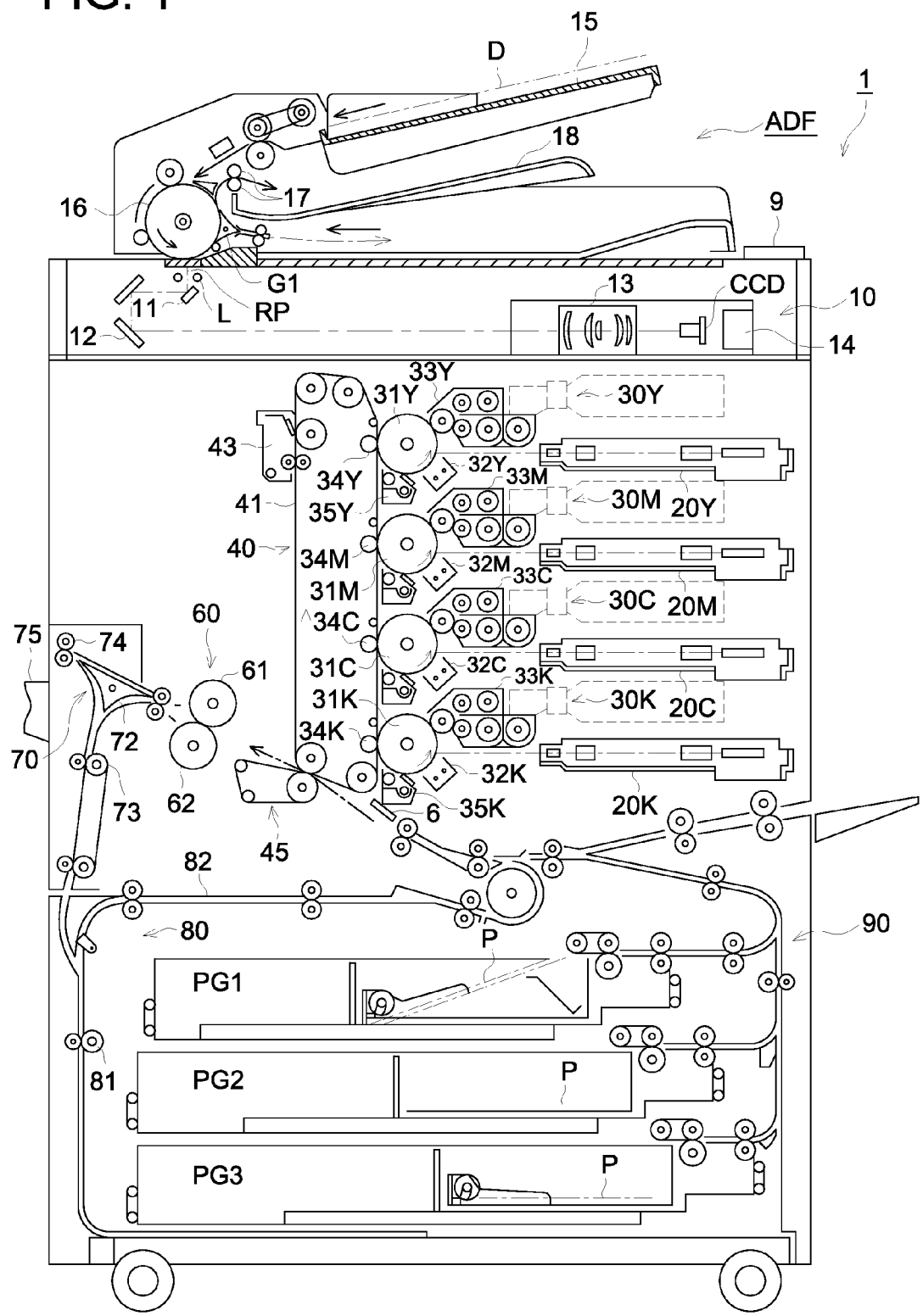
FIG. 1 is an illustration view schematically showing the constitution of an image forming apparatus 1.

FIG. 1 is an illustration view schematically showing the constitution of an image forming apparatus 1 according to the present embodiment. The image forming apparatus 1 is an electrophotographic image forming apparatus which is referred to as, for example, a copier, being a so-called tandem-type color image forming apparatus in which a plurality of photoreceptor drums are arranged in the vertical direction opposed to a single intermediate transfer belt so as to form full-color images.

This image forming apparatus 1 mainly contains a document reading section 10, image forming sections 30Y, 30M, 30C, and 30K, an intermediate transfer section 40, a secondary transfer section 45, a fixing device 60, a sheet discharge reversing section 70, a sheet re-feeding section 80, a sheet feeding section 90, and an image formation control section 5 (refer to FIG. 3), and these are placed in a single housing.

The document reading section 10 is provided with an automatic document feeder ADF on top thereof. Documents D having been placed on the document placement table 15 of the automatic document feeder ADF are separated one by one and sent out to the document conveyance path to be conveyed by the conveyance drum 16. A first conveyance guide G1 and the document discharging roller 17 discharge the document D having been conveyed by the conveyance drum 16 to the document discharging tray 18.

The document reading section 10 reads an image of the document D which is being conveyed by the conveyance drum 16 in the document image reading position RP. Specifically, in the document image reading position RP, the image of the document D is irradiated with a lamp L. Reflective light associated with irradiation is introduced by a first mirror unit 11, a second mirror unit 12, and a lens unit 13 to be focused on the light receiving surface of an imaging element CCD. The imaging element CCD photoelectrically converts incident light to output a prescribed image signal. The output image signal is subjected to A/D conversion to produce image data.

The image reading control section 14 carries out processing such as shading correction, dither processing, and compression for image data to store image data obtained via this processing in a memory section such as a RAM of the image formation control section 5. Herein, the image data may not only be data output from the document reading section 10 but also data received from a personal computer connected to the image forming apparatus 1 or from another image forming apparatus.

The image forming section 30Y contains an exposure section 20Y and a photoreceptor drum 31Y, as well as a main charging section 32Y, a developing section 33Y, a first transfer roller 34Y, and a cleaning section 35Y arranged in the periphery of the photoreceptor drum 31Y to form an image (a toner image) corresponding to yellow. Other image forming sections 30M, 30C, and 30K have the same constitution as the image forming section 30Y, containing exposure sections 20M, 20C, and 20K and photoreceptor drums 31M, 31C, and 31K, as well as main charging sections 32M, 32C, and 32K, developing sections 33M, 33C, and 33K, first transfer rollers 34M, 34C, and 34K, and cleaning sections 35M, 35C, and 35K arranged in the periphery of the photoreceptor drums 31M, 31C, and 31K, respectively, to form an image (a toner image) corresponding to each color of magenta, cyan, and black.

The exposure sections 20Y-20K each contain a laser light source, a polygon mirror, and a plurality of lenses, which are not illustrated, to generate laser beams. The exposure sections 20Y-20K scan and expose the surfaces of the photoreceptor drums 31Y-31 K, respectively, in response to output information output from the image formation control section 5 based on image data. Specifically, the exposure sections 20Y-20K each reflect laser light emitted from a laser light source using a rotating polygon mirror to repetitively scan the surfaces of the photoreceptor drums 31Y-31K with the laser light in the axis direction thereof (the main scanning direction). Via this scanning exposure, latent images are formed each on the photoreceptor drums 31Y-31K.

Herein, the exposure section 20Y is attached with an unshown correction mechanism. This correction mechanism is driven based on a correction signal from the image formation control section 5 to adjust an inclination of the horizontal position of the exposure section 20Y. This correction mechanism is also attached to the other exposure sections 20M-20K in the same manner.

The main charging sections 32Y-32K uniformly charge the surfaces of the photoreceptor drums 31Y-31K, respectively. The developing sections 33Y-33K each visualize latent images on the photoreceptors 31Y-31K via tone development. Thereby, toner images are formed each on the photoreceptor drums 31Y-31K. The first transfer rollers 34Y-34K sequentially transfer the toner image having been formed on the photoreceptors drums 31Y-31K to a predetermined position of the intermediate transfer section 40 (specifically, an intermediate transfer belt 41), respectively. The cleaning sections 35Y-35K eliminate toners remaining on the surfaces of the photoreceptor drums 31Y-31K on which toner image transfer has been finished.

The intermediate transfer section 40 mainly contains an intermediate transfer belt 41. The intermediate transfer belt 41 is constituted to be rotatably wound by a plurality of rollers and the four image forming sections 30Y-30K each are arranged opposed thereto. When a toner image is transferred from each of the image forming sections 30Y-30K, this intermediate transfer belt 41 feeds the this transferred toner image to a transfer position. Then, the intermediate transfer belt 41 cooperates with a secondary transfer section 45 to be described later to transfer onto a sheet P, the toner image having been transferred onto the intermediate transfer belt 41. The sheet P serving for transfer of such a toner image is fed from any of the trays PG1, PG2, and PG3 constituting the sheet feeding section 90 and then sent to the transfer position while being timed using a registration roller. The belt cleaning section 43 cleans the surface of the intermediate transfer belt 41 on which toner image transfer onto the sheet P has been finished. The cleaned intermediate transfer belt 41 is allowed to serve for the next image transfer.

Figure 2:
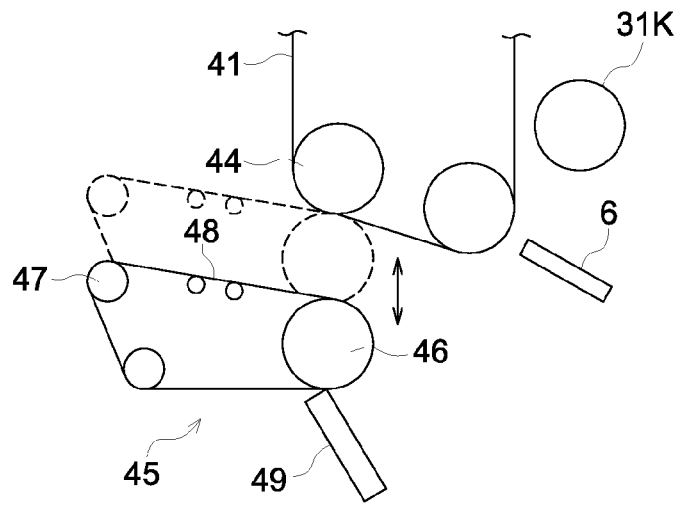
FIG. 2 is an illustration view schematically showing the constitution of the image forming apparatus 1 with a central focus on a secondary transfer section 45.

As shown in FIG. 2, the secondary transfer section 45 mainly contains a secondary transfer roller 46, a drive roller 47, a secondary transfer belt 48, and a cleaning section 49, and transfers a toner image having been transferred on the intermediate transfer belt 41 onto a sheet P. A plurality of rollers including the secondary transfer roller 46 and the drive roller 47 are wound by an endless secondary transfer belt 48. This secondary transfer belt 48 is rotated at a predetermined velocity using a drive roller 47 rotationally driven by an unshown drive motor. The belt cleaning section 49 incorporates, for example, a blade to clean the surface of the secondary transfer belt 48.

In the present embodiment, the secondary transfer section 45 is structured to be movable up and down using a secondary transfer, drive section 50 (refer to FIG. 3) so that the state of being pressed against the intermediate transfer belt 41 and the state of being separated from the intermediate transfer belt 41 can be switched. In the state where the secondary transfer section 45 is pressed against the intermediate transfer belt 41 (the pressed state), the intermediate transfer belt 41 and the secondary transfer belt 48 are nipped by the intermediate transfer roller 44 and the secondary transfer roller 46 to create a state in which both belts 41 and 48 are pressed against each other. Thereby, when a sheet P is allowed to pass through the transfer position which is a pressure portion produced by the intermediate transfer belt 41 and the secondary transfer belt 48, a toner image can be transferred onto the sheet P. On the other hand, in the state where the secondary transfer section 45 is separated from the intermediate transfer belt 41 (the separated state), the intermediate transfer belt 41 and the secondary transfer belt 48 are separated from each other at a predetermined distance.

Referring to FIG. 1 again, the fixing device 60 presses and heats a sheet P on which a toner image has been fixed, to fix the toner image onto the sheet P. The fixing device 60 incorporates, for example, a fixing upper roller 61 and a fixing lower roller 62 which are paired fixing members. The fixing upper roller 61 and the fixing lower roller 62 are arranged to be in pressure contact with each other. As the pressure contact portion produced by the fixing upper roller 61 and the fixing lower roller 62, a fixing nip portion is formed.

In the interior of the fixing upper roller 61, a heating device (e.g., a heater) to heat the fixing upper roller 61, that is, to heat and fix a toner image on a sheet P is incorporated. Radiant heat from this heating device heats the fixing upper roller 61. Then, heat possessed by the fixing upper roller 61 is transmitted to the sheet P.

In this fixing device 60, a sheet P is conveyed so that the surface thereof subject to fixing faces the fixing upper roller 61 and passed through the fixing nip portion during the process of sheet P conveyance. Thereby, via the action of pressurization by the fixing upper roller 61 and the fixing lower roller 62 and heat possessed by the fixing upper roller 61, the toner image is fixed to the sheet P.

The sheet discharge reversing section 70 conveys the sheet P having been fixed by the fixing device 60 to be discharged to the sheet discharging tray 75. When the sheet P is discharged via front-rear reversing, the sheet discharging guide 72 temporally guides the sheet P downward. The sheet discharge reversing roller 73 nips the back end of the sheet P and thereafter the sheet P is reversed and conveyed. Then, the sheet discharging guide 72 guides the sheet P to the sheet discharging roller 74. Thereby, the sheet P is discharged onto the sheet discharging tray 75.

Further, in the case of double-sided printing in which image formation is carried out on both the front side and the rear side of a sheet P instead of single-sided printing in which image formation is carried out only on the front side of the sheet P, the sheet discharging guide 72 conveys a sheet P, a toner image on whose front side has been fixed, to the sheet re-feeding section 80 located below. The back end of the sheet P is nipped by the reversing roller 81, which is one of the constituent elements of the sheet re-feeding section 80, and sent backward, whereby the sheet P is reversed to be sent out to the sheet re-feeding conveyance path 82. Thereby, via the sheet re-feeding conveyance path 82, the sheet P is served for image formation on the rear side thereof.

Figure 3:
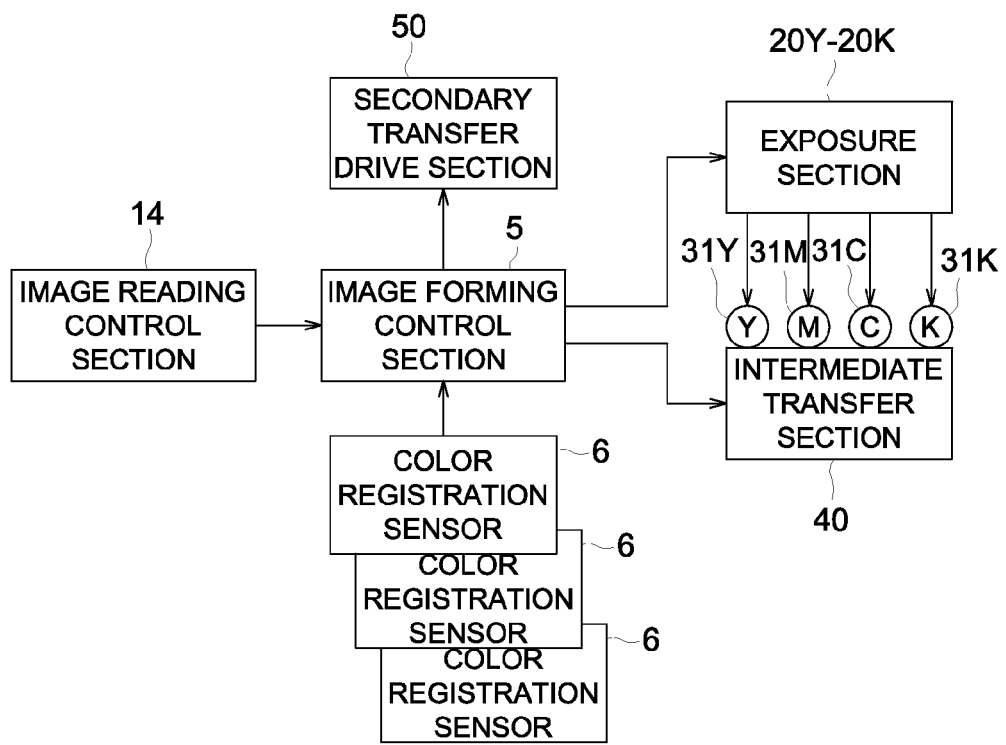
FIG. 3 is a block diagram showing the configuration of the control system of the image forming apparatus 1.

FIG. 3 is a block diagram showing the configuration of the control system of the image forming apparatus 1 according to the present embodiment. As the image formation control section 5, a microcomputer mainly incorporating, for example, a CPU, a ROM, a RAM, and an I/O interface is usable. The image formation control section 5 executes various types of operation in accordance with a control program stored in the ROM, and based on the result of this operation, the operation state of the image forming apparatus 1 is controlled.

The image formation control section 5 controls each section of the image forming apparatus 1 to execute a series of processes shown below, and thereby a toner image is formed on a sheet P being conveyed: (1) the photoreceptor drums 31Y-31K are charged; (2) using the exposure sections 20Y-20K, electrostatic latent images are formed on the photoreceptor drums 31Y-31K; (3) toners are allowed to adhere to the formed electrostatic latent images; (4) toner images on the photoreceptor drums 31Y-31K are primarily transferred onto the intermediate transfer belt 41; (5) toner images on the intermediate transfer belt 41 are secondarily transferred onto a sheet P; and (6) the toner image is fixed to the sheet P by the fixing device 60.

Further, as one of the features of the present embodiment, the image formation control section 5 carries out correction processing of the position of an image formed by each of the image forming sections 30Y-30K, so-called color registration correction processing (a function as the correction section possessed by the image formation control section 5). Specifically, the image formation control section 5 forms correction pattern images using the four image forming sections 30Y-30K. Then, the image formation control section 5 corrects the position of an image formed by each of the image forming sections 30Y-30K based on detection results of the registration sensors 6 with respect to the pattern images. This color registration correction processing is carried out outside the execution time of a print job for image formation on a sheet P based on image data, for example, during power activation of the image forming apparatus 1 or at the time (or the duration) when via an unshown operation section/a PC, the user has issued instructions for color registration correction processing.

Herein, the registration sensors (detection sections) 6 are provided in the vicinity of the intermediate transfer belt 41 and arranged, as shown in FIG. 1 or FIG. 2, on the downstream side of an image forming section (in the present embodiment, the image forming section 30K corresponding to black) located on the most downstream side and also on the upstream side of the transfer position in the rotational direction of intermediate transfer belt 41. In the present embodiment, three registration sensors 6 are arrayed in the main scanning direction.

The individual registration sensor 6 is arranged so that the detection surface thereof faces the intermediate transfer belt 41. As the individual registration sensor 6, a reflection-type photosensor can be used. The reflection-type photosensor is constituted of, for example, a light emitting element such as an LED, a light receiving element, and an optical element (a lens) to allow light which has been emitted from the light emitting element and has been reflected by a subject to be detected existing in the detection position to be focused on the light receiving surface. When a pattern image reaches the detection position, the registration sensor 6 detects the pattern image via signal switching between ON and OFF in response to the shape of the pattern image.

Figure 4:
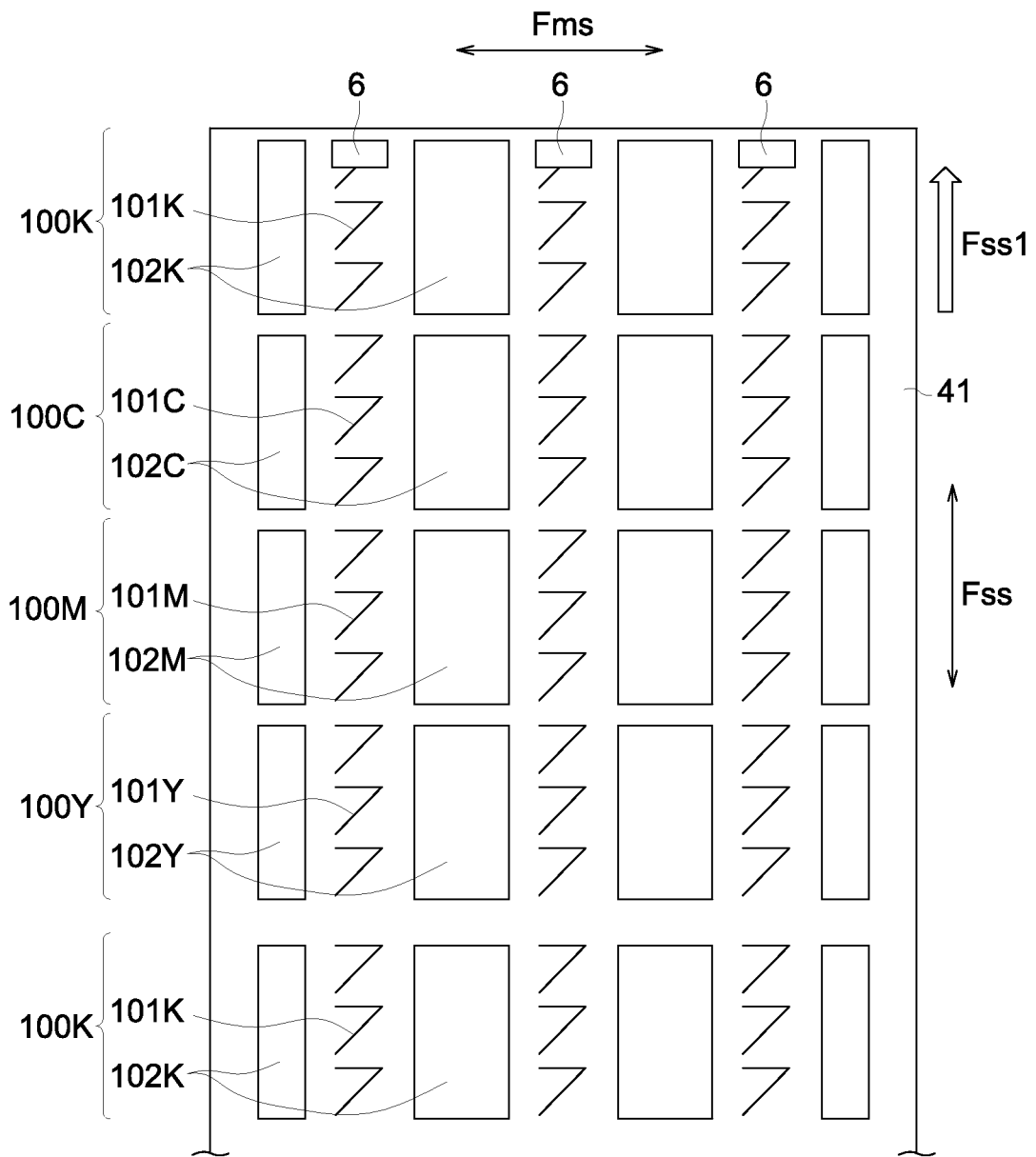
FIG. 4 is an illustration view schematically showing correction pattern images 100Y-100K having been transferred on an intermediate transfer belt 41.

FIG. 4 is an illustration view schematically showing correction pattern images 100Y-100K having been transferred on the intermediate transfer belt 41. In the figure, "Fms" represents the main scanning direction and "Fss" represents the sub-scanning direction which is the direction at right angles to the main scanning direction. "Fss1" represents the rotational direction of the intermediate transfer belt 41. The pattern images 100Y-100K each are configured in such a manner that one or a plurality of mark groups each in which a plurality of predetermined registration marks 101Y-101K are arranged in positions corresponding to the registration sensors 6 in the main scanning direction, are arrayed in the sub-scanning direction Fss. The registration marks 101Y-101K each are configured in such a manner that for example, a straight line parallel to the main scanning direction Fms and a straight line inclined with respect to this line are combined. Herein, in this color registration correction processing, it is desirable that individual color images be independently formed on the intermediate transfer belt 41. Therefore, for example, the image formation control section 5 operates the image forming sections 30Y-30K in the same timing to simultaneously form pattern images 100Y-100K, respectively.

Incidentally, during execution of color registration correction processing, when only registration marks 101Y-101K are formed as pattern images 100Y-100K, print rate is decreased compared with the usual printing operation and then the frictional state between the photoreceptor drums 31Y-31K and the intermediate transfer belt 41 become different, whereby correction accuracy may be decreased. Therefore, to prevent this problem, each of the image forming sections 30Y-30K also forms a plurality of predetermined images (for example, rectangular solid images 102Y-102K) in the main scanning direction Fms as pattern images 100Y-100K. Of course, as the pattern images 100Y-100K, such solid images 102Y-102K are not necessarily required to be formed.

In the present embodiment, color registration correction processing contains, for example, each of correction processings (A)-(E) shown below. For example, the color registration correction processing is carried out based on a pattern image 100K formed by the image forming section 30K corresponding to black. That is to say, pattern images 100Y-100C formed by the image forming sections 30Y-30C corresponding to yellow, magenta, and cyan are subjected to various types of correction so as to respond to a pattern image 100K formed by the image forming section 30K corresponding to black.

(A) Main Scanning Correction Processing

This processing is a correction in which the image positions with respect to the main scanning direction of toner images formed by the image forming sections 30Y-30K each, namely, the writing initiation positions of the exposure sections 20Y-20K in the main scanning direction Fms on the photoreceptor drums 31Y-31K are aligned. Specifically, on the basis of detection results of the registration sensors 6 with respect to a registration mark 101K (a black registration mark 101K) formed by the image forming section 30K and registration marks 101Y-101C (yellow, magenta, and cyan registration marks 101Y-101 C) formed by the other image forming sections 30Y-30C, the image formation control section 5 determines the misalignment amount of both in the main scanning direction Fms to calculate each correction amount from this misalignment amount. Then, on the basis of the correction amount corresponding to each color of yellow, magenta, and cyan, the writing timing of each of the exposure sections 20Y-20C corresponding to yellow, magenta, and cyan is adjusted. Thereby, the writing initiation positions in the main scanning direction Fms of the image forming section 30K corresponding to black and the image forming sections 30Y-30C corresponding to the other colors are aligned.

(B) Sub-Scanning Correction Processing

This processing is a correction in which the image positions with respect to the sub-scanning direction Fss of toner images formed by the image forming sections 30Y-30K each, namely, the writing initiation positions of the exposure sections 20Y-20K in the sub-scanning direction Fss on the photoreceptor drums 31Y-31K are aligned. Specifically, on the basis of detection results of the registration sensors 6 with respect to a black registration mark 101K and yellow, cyan, and magenta registration marks 101Y-101C, the image formation control section 5 determines the misalignment amount of both in the sub-scanning direction Fss to calculate each correction amount from this misalignment amount. Then, on the basis of the correction amount corresponding to each color of yellow, magenta, and cyan, the writing timing of each of the exposure sections 20Y-20C corresponding to yellow, magenta, and cyan is adjusted. Thereby, the writing initiation positions in the sub-scanning direction Fss of the image forming section 30K corresponding to black and the image forming sections 30Y-30C corresponding to the other colors are aligned.

(C) Entire Lateral Magnification Correction Processing

This processing is a correction in which the image forming positions of the entire toner images fanned by the image forming sections 30Y-30K each are aligned. For example, the image formation control section 5 adjusts the cycle of an image clock signal to adjust the laser emitting timing. Thereby, the misalignments between the image forming position in the entire toner image of the image forming section 30K corresponding to black and the image forming positions in the entire toner images of the image forming sections 30Y-30C corresponding to the other colors are eliminated.

(D) Partial Lateral Magnification Correction Processing

This processing is a correction in which the inclination with respect to the horizontal position of each of the exposure sections 20Y-20K is adjusted. For example, the image formation control section 5 drives a correction mechanism attached to each of the exposure sections 20Y-20K to adjust the inclination with respect to the horizontal position of each of the exposure sections 20Y-20K relative to the photoreceptor drums 31Y-31K.

(E) Skew Correction Processing

This processing is a correction in which the inclination of the vertical position of a predetermined lens in each of the exposure sections 20Y-20K. For example, the predetermined lens is attached with an unshown correction mechanism, and this correction mechanism is driven in response to a correction signal from the image formation control section 5 to adjust the inclination of the vertical position of the lens. For example, the image formation control section 5 drives a correction mechanism attached to a predetermined lens to adjust the inclination of the vertical position of the lens relative to the photoreceptor drums 31Y-31K.

Further, in the present embodiment, the image formation control section 5 controls the secondary transfer drive section 50 and thereby the switching control of the secondary transfer section 45 is carried out between in the pressed state and in the separated state (a function as the transfer control section possessed by the image formation control section 5). The image formation control section 5 sets the secondary transfer section 45 in the separated state as the initial state. Then, the image formation control section 5 switches the secondary transfer section 45 from the separated state to the pressed state in response to the execution initiation of a print job, and then switches the secondary transfer section 45 from the pressed state to the separated state in response to the execution termination of the print job.

Still further, the image formation control section 5 controls the secondary transfer section 45 to be in the pressed state as appropriate in the case of execution of color registration correction processing. Specifically, when a first correction processing which is the correction of the image position with respect to the main scanning direction, that is, in the present embodiment, main scanning correction processing (corresponding to a second color registration correction processing to be described later) is carried out, the image formation control section 5 sets the secondary transfer section 45 in the pressed state. And, when a second correction processing which is the correction of the image positions related to components other than the main scanning correction processing, that is, in the present embodiment, a sub-scanning correction processing an entire lateral magnification correction processing, a partial lateral magnification correction processing, or a skew correction processing (corresponding to a first color registration correction processing to be described later) is carried out, the image formation control section 5 sets the secondary transfer section 45 in the separated state. That is to say, as described above, the image formation control section 5 controls the secondary transfer section 45 to be in the separated state as the initial state outside the execution time of a print job and switches the secondary transfer section 45 to the pressed state in the case of execution of a main scanning correction processing.

FIG. 5 is a flowchart showing operation steps of color registration correction processing. The processing shown by this flowchart is carried out by the mage formation control section 5. Incidentally, in execution of each processing described below, the secondary transfer section 45 is set in the separated state.

Initially, in step 1 (S1), the image formation control section 5 carries out a coarse adjustment. This coarse adjustment is a processing to roughly correct the position misalignment of an image prior to substantive correction processing. Specifically, the image formation control section 5 forms pattern images 100Y-100K once using the image forming sections 30Y-30K.

Subsequently, the image formation control section 5 reads detection results of the registration sensors 6 related to the pattern images 100Y-100K for each color. In this case, the registration sensors 6 are not required to be always powered on. The registration sensors 6 may be switched on in response to passing of the pattern images 100Y-100K. For example, employable are such steps that after a predetermined time has elapsed from the time when pattern images 100Y-100K had been formed by the image foliating sections 30Y-30K, the registration sensors 6 are switched on and the ON state is continued, and then after a predetermined time has elapsed, the registration sensors 6 are turned off. Such operations of the registration sensors 6 are applicable to steps to be described later in the same manner.

Herein, when the processing of the present step is being carried out after a negative judgment has been made in the processing of step 2 (S2) to be described later, the image formation control section 5 carries out the following processing. Specifically, referring to detection results of the registration sensors 6, the image formation control section 5 carries out any appropriate one of (A)-(E) described above so that registration marks 101Y-101K formed by the image forming sections 30Y-30K fall in a predetermined range.

In step 2 (S2), on the basis of the detection results of the registration sensors 6, the image formation control section 5 judges whether each of the pattern images 100Y-100K has been formed in a predetermined range having been preset, namely, whether the misalignment amount of the pattern images 100Y-100K has been converged in the predetermined range. Since the coarse adjustment of step 1 is a correction with coarse accuracy to some extent which is carried out prior to execution of a first and a second color registration processing being fine adjustments, the predetermined range can also be roughly set to a necessary extent. When a positive judgment has been made in step 2, namely, when each of the pattern images 100Y-100K has been formed in a predetermined range, a progress is made to step 3 (S3). On the other hand, when a negative judgment has been made in step 2, namely, when any of the pattern images 100Y-100K has not been formed in the predetermined range, a return is made to step 1.

In step 3, the image formation control section 5 carries out a first color registration correction processing. In this first color registration correction processing, correction processing other than a main scanning correction processing out of the color registration correction processing described above is carried out. In other words, in the present embodiment, a sub-scanning correction processing, an entire lateral magnification correction processing, a partial lateral magnification correction processing, and a skew correction processing are carried out in this step.

Specifically, the image formation control section 5 forms pattern images 100Y-100K "n" times (n: a natural number of at least 1) using the image forming sections 30Y-30K. Then, the image formation control section 5 reads detection results of the registration sensors 6 with respect to the pattern images 100Y-100K, and carries out a sub-scanning correction processing, an entire lateral magnification correction processing, a partial lateral magnification correction processing, and a skew correction processing respectively, based on the average value of the pattern images 100Y-100K having been formed "n" times. Herein, as the number of formation times "n" of the pattern images 100Y-100K, an optimum number is preferably preset based on variation factors which may cause the position misalignment of an image in the sub-scanning direction.

In step 4 (S4), the image formation control section 5 controls the secondary transfer section 45 being in the separated state to be in the pressed state. Herein, the time of switching the secondary transfer section 45 to the presses state is basically after termination of a first color registration correction processing. However, the above time may be any time after time recognized to produce no effect on the first registration correction processing, and may be specifically after a final pattern image formed by an image forming section located most upstream in the rotational direction Fss1 of the intermediate transfer belt 41 (in the present embodiment, the image forming section 30Y corresponding to yellow) has passed through the registration sensor 6.

In step 5 (S5), the image formation control section 5 carries out a second color registration correction processing. In this second color registration correction processing, a main scanning correction processing out of the above types of color registration correction processing is carried out.

Specifically, the image formation control section 5 forms pattern images 100Y-100K "m" times (m: a natural number of at least 1) using the image forming sections 30Y-30K. Then, the image formation control section 5 reads detection results of the registration sensors 6 with respect to the pattern images 100Y-100Y, and carries out, a main scanning correction processing for each based on the average value of the pattern images 100Y-100K having been formed "m" times. Herein, as the number of formation times "m" of the pattern images 100Y-100K, an optimum number is preferably preset based on variation factors which may cause the position misalignment of an image in the main scanning direction.

In, step 6 (S6), the image formation control section 6 controls the secondary transfer section 45 being in the pressed state to being in the separated state.

In this manner, in the present embodiment, the image formation control section 5 sets the secondary transfer section 45 in the pressed state when carrying out a main scanning correction processing (a second color registration correction processing) as color registration correction, and sets the secondary transfer section 45 in the separated state when carrying out a first color registration correction processing being the correction of the image position with respect to components other than the main scanning direction as color registration correction.

According to such a configuration, in the case of a main scanning correction processing, since the secondary transfer section 45 is being set in the pressed state, the situation where fluctuation components of the intermediate transfer section 40 are included in detection results can be prevented. Thereby, the situation where the correction accuracy of the image position with respect to the main scanning direction is decreased can be prevented. Further, in the case of a first color registration correction processing with respect to components other than the main scanning direction in which fluctuation components of the intermediate transfer section 40 are independent of correction accuracy, since the second transfer section 45 is being set in the separated state, the situation where correction pattern images are transferred onto the secondary transfer section 45 can be prevented. Thereby, when a print job is executed, the situation where print quality is degraded can be prevented. Therefore, the situation where the correction accuracy of the image position with respect to the main scanning direction is decreased can be prevented, and also a decrease in print quality due to a residual image associated with color registration correction processing can be prevented.

Herein, the image formation control section 5 sets the secondary transfer section 45 in the separated state as the initial state and then switches the secondary transfer section 45 to the pressed state when carrying out a main scanning correction processing as color registration correction, whereby the same effect as described above can be obtained.

Further, in the present embodiment, the image formation control section 5 carries out a first color registration correction processing first and then a second color registration correction processing when carrying out color registration correction processing. Then, after execution of the first color registration correction processing, the secondary transfer section 45 being in the separated state is switched to the pressed state.

If a second color registration correction processing has been carried out first and then a first color registration correction processing has been carried out, the intermediate transfer section 40 needs to be operated in the state where the secondary transfer section 45 is in the separated state after the second color registration correction processing. In this case, due to execution of the first color registration correction processing, the state of the intermediate transfer belt 41 during the second color registration processing and the state of the intermediate transfer belt 41 during execution of a print job after the first color registration correction processing become different from each other, and thereby the result of the second color registration correction processing may not be reflected precisely. However, as in the present embodiment, when color registration correction is carried out in this order of a first color registration processing and a second color registration correction processing, the situation where the intermediate transfer section 40 is operated in the state where the secondary transfer section 45 is separated after the second color registration correction processing is not created. Thereby, the correction accuracy of the image position with respect to the main scanning direction can be enhanced.

Further, in the present embodiment, the image formation control section 5 sets the secondary transfer section 45 in the separated state as the initial state and then switches the secondary transfer section to the pressed state in accordance with execution of a print job. Then, color registration correction is carried out outside the execution time of the print job. Thereby, without switching control of the secondary transfer section 45, the transfer to the color registration correction can be realized, whereby necessity of a cumbersome control can be avoided.

Further, in the present embodiment, the image formation control section 5 forms correction pattern images 100Y-100K using the image forming sections 30Y-30K for every processing of a first and a second color registration correction processing and also corrects the image position based on detection results of the color registration sensors 6 regarding the correction pattern images 100Y-100K. In this manner, necessary correction pattern images 100Y-100K are formed and thereby color registration correction can be effectively carried out.

Further, in the present embodiment, the image formation control section 5 switches the secondary transfer section 45 to the pressed state after correction pattern images 100Y-100K for a first color registration correction processing have passed through the color registration sensors 6. Specifically, after a correction pattern image 100Y having been formed by an image forming section located most upstream in the rotational direction Fss1 of the intermediate transfer belt 41 (in the present embodiment, the image forming section 30Y corresponding to yellow) has passed through the registration sensor 6, the secondary transfer section 45 is switched to the pressed state. When the secondary transfer section 45 is switched to the pressed state, an impact is applied to the intermediate transfer belt 40, which is then, swung to some extent. However, if switching to the pressed state is carried out as quickly as possible, such an effect can be prevented from being contained in the second color registration correction processing. Thereby, the correction accuracy of the image position with respect to the main scanning direction can be enhanced. Further, after correction pattern images 100Y-100K for the first color registration correction processing pass through the color registration sensors 6, switching to the pressed state is carried out. Due to this, unnecessary noise can be prevented from being applied to the first color registration correction processing.

The image forming apparatus according to the preferred embodiments of the present invention has been described. However, it goes without saying that the present invention is not limited to the above embodiments and, various modifications can be made in the scope of the invention. For example, the second color registration correction processing is not limited to the above sub-scanning correction processing, entire lateral magnification correction processing, partial lateral magnification correction processing, or skew correction processing. One or combinations of any of these are employable and image position correction with respect to components other than the main scanning direction can be widely included. Further, the present invention can be applied to not only a color image forming apparatus provided with an intermediate transfer section but also a monochrome image forming apparatus provided with an intermediate transfer section.

According to the preferred embodiment of the present invention, in the case of execution of a first correction processing, since the secondary transfer section is being set in the pressed state, the situation where fluctuation components of the intermediate transfer section are contained in detection results can be prevented. Thereby, the situation where the correction accuracy of the image position with respect to the main scanning direction is decreased can be prevented. On the other hand, in the case of execution of a second correction processing, since the secondary transfer section is being set in the separated state, the situation where an image is transferred to the secondary transfer section can be prevented. Thereby, when a print job is executed, the situation where print quality is decreased can be prevented.

What is claimed is:

1. An image forming apparatus comprising:
    an image forming section for forming an image to be transferred;
    an intermediate transfer section to which the image having been formed by the image forming section is transferred;
    a secondary transfer section for transferring to a sheet, the image having been transferred to the intermediate transfer section;
    a detection section for detecting the image having been transferred to the intermediate transfer section;
    a correction section for performing correction processing of a position of the image formed by the image forming section based on a detection result of the detection section; and
    a transfer control section for performing switching control between a pressed state where the secondary transfer section is pressed against the intermediate transfer section and a separated state where the secondary transfer section is separated from the intermediate transfer section,
    wherein, when the correction section carries out, as the correction processing a first correction processing which is a correction processing of the image position with respect to a main scanning direction, the transfer control section sets the secondary transfer section in the pressed state, and when the correction section conies out, as the correction processing, a second correction processing which is a correction processing of the image position with respect to a component other than the main scanning direction, the transfer control section sets the secondary transfer section in the separated state.

2. The image forming apparatus of claim 1,
    wherein when performing the correction processing, the correction section carries out the second correction processing first and then carries out the first correction processing, and the transfer control section switches the secondary transfer section being in the separated state into the pressed state after the performance of the second correction processing.

3. The image forming apparatus of claim 2,
    wherein the transfer control section sets the secondary transfer section in the separated state as an initial state and then switches the secondary transfer section to the pressed state in response to execution of a print job, and the correction section carries out the first correction processing and the second correction processing outside time of the execution of the print job.

4. The image forming apparatus of claim 2,
    wherein the correction section allows the image forming section to form a pattern image for correction and also corrects the position of the image based on the detection result of the detection section with respect to the pattern image for correction every time the first correction processing and the second correction processing are carried out.

5. The image forming apparatus of claim 4,
    wherein the transfer control section switches the secondary transfer section to the pressed state after the pattern image for correction for the second correction processing has passed through the detection section.

6. The image forming apparatus of claim 5,
    wherein the image forming section is composed of a plurality of image forming sections corresponding to colors which serve as elements of a color image, and the transfer control section switches the secondary transfer section to the pressed state after the pattern image for correction, which has been formed by the image forming section located most upstream in a rotational direction of the intermediate transfer section has passed through the detection section.

7. An image forming apparatus comprising:
    an image forming section for forming an image to be transferred;
    an intermediate transfer section to which the image having been formed by the image forming section is transferred;
    a secondary transfer section for transferring to a sheet, the image having been transferred to the intermediate transfer section;
    a detection section for detecting the image having been transferred to the intermediate transfer section;

a correction section for performing correction processing of a position of the image formed by the image forming section based on a detection result of the detection section; and a transfer control section for performing switching control between a pressed state where the secondary transfer section is pressed against the intermediate transfer section and a separated state where the secondary transfer section is separated from the intermediate transfer section, wherein the transfer control section sets the secondary transfer section in the separated state as an initial state, and when the correction section corrects the image position with respect to a main scanning direction as the correction processing, the transfer control section sets the secondary transfer section in the pressed state.

* * * * *